United States Patent Office 3,449,076
Patented June 10, 1969

3,449,076
PREHEATING OXIDIZING GAS REACTANT IN
TiO₂ PIGMENT MANUFACTURE
Elmer S. Monroe, Jr., Newark, Del., assignor to E. I.
du Pont de Nemours and Company, Wilmington, Del.,
a corporation of Delaware
No Drawing. Filed Oct. 10, 1966, Ser. No. 585,303
Int. Cl. C01g 23/04
U.S. Cl. 23—202          7 Claims

ABSTRACT OF THE DISCLOSURE

In the manufacture of titanium dioxide by oxidation of titanium tetrachloride, the method of heating the gaseous oxygen employed for oxidation comprising heating it to a temperature of 800°–1,300° C., and then further heating it to a higher temperature attained by injecting liquid droplets of fuel countercurrently into the gaseous oxygen.

---

This invention relates to titanium dioxide pigment manufacture and more particularly to novel methods for preheating an oxidizing gas utilized as a reactant in the vapor phase oxidation of titanium tetrachloride to produce said $TiO_2$ pigment.

More specifically, the invention pertains to a two-stage method for raising the temperature of a process oxidizing gas stream containing elemental oxygen being fed to a reaction zone for spontaneous reaction therein with titanium tetrachloride being separately charged to said zone, comprising the steps of (a) initially preheating said gas under non-contaminating conditions to at least an auto-ignition temperature for the second stage fuel used ranging from about 800–1,300° C., and (b) subsequently increasing the temperature of the preheated gas to a range of from 1,000° C. to 1,800° C. by directly injecting therein in a direction counter-current to the flow of the preheated gas through a conveying conduit droplets of a combustible liquid fuel in amounts less than the stoichiometric equivalent of the elemental oxygen present in said gas.

The production of pigmentary rutile $TiO_2$ by reacting a titanium halide, especially titanium tetrachloride, in the vapor phase with an oxidizing gas, such as air, oxygen, oxygen-enriched air, water vapor or mixtures thereof, within a closed reaction zone is well known. Examples of highly useful procedures therefor include the disclosures of U.S. Patents Nos. 2,488,439, 2,559,638 and 2,791,490. In these procedures the $TiCl_4$ and oxidizing gas, prior to reaction, are separately preheated in corrosion-resistant equipment. The $TiCl_4$ employed is in relatively pure form in respect to discoloring impurities but may, if desired, contain ancillary metal chlorides, such as a volatile chloride of a white oxide-producing metal, such as aluminum, silicon, tin, zirconium, etc. or mixtures thereof. Due to the highly corrosive nature of said chlorides, the preheating preferably is restricted to temperatures ranging from 300–500° C. To maintain the $TiO_2$-producing reaction temperature in a desired range of from 800 to 1,600° C., and, preferably, from 1,100 to 1,400° C., the oxygen-containing reactant is preheated to a higher (above 1,200° C.) temperature than the $TiCl_4$.

Preheating an oxygen-containing gas to such relatively high temperatures is very difficult because of a lack of practically useful refractory heat exchange materials, their poor heat transfer characteristics and the frequent equipment failures which are encountered due to the prevailing thermal and corrosive conditions. Heating the gas by direct combustion of a fuel requires burner and excess oxygen use, the observance of precautionary measures to avoid explosions and apparatus to ignite the gases when the flame goes out. To control the flame position use is also required of flame holders, baffles, and similar equipment, all of which are costly and difficult to maintain under the prevailing high temperatures in oxidizing $TiCl_4$ for $TiO_2$ manufacture. Furthermore, the use of fuels relatively high in hydrogen, such as the various liquid hydrocarbons, are avoided in these operations with greater emphasis being placed on gaseous carbon monoxide and powdered carbon use. These prove disadvantageous because the former is poisonous and expensive and the latter is difficult to feed to a flame and can contribute contaminating residues in the final $TiO_2$ product. A further disadvantage in prior liquid fuel use in $TiCl_4$ oxidation resides in an undesired ignition delay even when the fuel-oxygen contact is brought about above the auto-ignition temperature. Such delay requires the use of lengthy combustion chambers and relatively long conduits between the injection and the reaction zone in order that complete fuel burning is effected before the reaction zone is reached. These prove not only expensive but their use involves undue heat losses. At the high temperatures involved, the presence of the actual fuel flame in the reaction zone tends to cause undesired overheating and degradation the ultimate pigment product.

In accordance with this invention, these and other difficulties characterizing prior oxidizing gas preheating methods and means are effectively overcome and by recourse to a combination of cooperative features affording an excellent control over the conditions under which such preheating is carried out. These embody, first, an initial preheating of the oxy-containing gas to at least a temperature which induces auto-ignition on introduction into the heated gas of a combustible fuel and will insure against flame-out; secondly, the atomization and injection of a liquid fuel into the gas stream to provide a relatively concentrated zone of a very reactive fuel therein; and, thirdly injecting said liquid fuel in a direction counter-current to and against the flow of the gas being preheated. As a result a surprising, desired control is assured over the location of the flame and, advantageously, complete combustion of said fuel is brought about in a relatively short section of the conveying conduit to thereby avoid and overcome any problems which would otherwise arise from ignition delay.

In practically adapting the invention, an oxygen-containing gas such as mentioned above, employed in a $TiCl_4$ oxidation to produce a pure or composite form of $TiO_2$ pigment in accordance with the disclosures of the above identified U.S. patents, is preliminarily heated to temperatures of from 800–1,300° C. and preferably within a range of 1,000–1,200° C. This can be conventionally undertaken in noncontaminating type heating media, e.g. electric arc, plasma jet or in solid surface heat exchangers, including electric resistance heaters, tubular heat exchangers and preheated solid surfaces, such as used in brick checker furnaces, pebble heaters and the like. Thereafter, and prior to introduction of the gas into the oxidation zone for reaction with the $TiCl_4$ reactant, it is subjected to an additional heating by means of hydrocarbon fuel combustion therein to increase its temperature to a range of from 1,000–1,800° C. and preferably to within 1,200–1,600° C. This is accomplished by directly injecting into the gas during its passage through a conveying conduit in a direction countercurrent to the flow of said gas, an atomized, combustible liquid hydrocarbon fuel, preferably toluene, which ignites upon introduction and admixture with the gas to generate sufficient flame for imparting the desired heating effect. The contemplated fuel injection can be readily effected by means of a suitable ultrasonic atomizer, e.g. an ultrasonic generator or high frequency vibration atomizing nozzle disposed in operative relationship with the conveying conduit and which functions to atomize the hydrocarbon liquid and inject it into the gas in droplet form suitably regulated in respect to size. The amount of fuel injection undertaken will vary and depend upon the preheat temperature, the reaction temperature desired, and the nature of hydrocarbon fuel employed, but is less than the stoichiometric equivalent of the elemental oxygen present in the gas. The amount used should, however, be adequate to generate sufficient flame and impart the desired heating with sufficient oxygen remaining in the gas after the combustion that a complete reaction will take place between the gas and the $TiCl_4$ reactant when the latter is mixed with the preheated gas in the oxidation zone. As is well known, in chloride process $TiO_2$ manufacture it is generally preferred that the oxidation be carried out with amounts of oxygen-containing gas sufficient to provide about 10% excess $O_2$ of the theoretical to obtain a product gas containing about 30% $Cl_2$ by volume when air is used as the reactant. It is, therefore, necessary to control the balance of materials involved to provide sufficient available oxygen in the gas entering the reactor, to be at least stoichiometrically equivalent to the chloride reactants involved, including the major titanium tetrachloride as well as the ancillary chlorides. To establish such balance, one may predetermine the desired preheat and second stage heat temperatures for the oxygen-containing gas and then provide the correct amount of metal halide vapor to the reaction zone, this amount being no more than the stoichiometric equivalent of the remaining free oxygen. For operation at the higher temperatures one may resort to the use of air enriched with oxygen or even pure oxygen.

After the desired 1,000–1,800° C. preheating has been imparted to the gas, it is charged to an oxidation reactor for conventional reaction with $TiCl_4$ or with a mixture of that reactant with other metal chlorides to obtain a $TiO_2$ pigment adapted for use in the various pigmenting applications mentioned in the patents above referred to.

To a clearer understanding of the invention the following specific example is given. This is merely illustrative of a particular adaptation of the invention and should not be considered as limiting its underlying principles and scope.

EXAMPLE

In this example two-stage preheating is undertaken of an oxygen-containing gas stream being separately charged through a conduit to a reaction zone of a reactor of the type shown in U.S. 2,791,490 for cooxidation in accordance with the teaching of U.S. 2,559,638 of a vaporous $TiCl_4$–$AlCl_3$ mixture being separately introduced into said zone. Previous to introduction, the $TiCl_4$ was vaporized by separate heating to a temperature of about 450° C. in an associated corrosion resistant heat exchanger and was mixed with about 1% by weight of $AlCl_3$. The oxidizing gas stream, consisting of a mixture of dry air and oxygen was metered into the system at a rate of 1,450 lbs./hr. of air and 3,246 lbs./hr. of $O_2$, and was first heated to 1,210° C. by passage through a pebble heater unit such as described in U.S. 2,417,049. In such unit the gaseous mixture is passed through a mass of refractory pebbles employed in the heating and previously heated to above 1,300° C. by means of hot combustion gases. The clean, heated air/oxygen gas stream from the pebble heater reached the inlet of a secondary or booster burner associated with the conveying conduit at 1,155° C. and while flowing at a linear velocity of about 75 ft./sec. through the conduit. This flow was decreased to a linear velocity of 9 ft./sec. by doubling the conduit diameter about 3 ft. upstream from the second stage burner prior to directly mixing the heated gas with toluene as an ignition fuel. Such mixing was brought about by injecting the fuel into the enlarged section of the conduit through an ultrasonic liquid dispersing nozzle situated on a 90° bend in said conduit and aimed toward the incoming gas stream. 40 lbs.%hr. of toluene was continuously injected into the stream countercurrently to its flow and in droplet form in this manner. The toluene ignited automatically on introduction with substantially all of the resulting flame forming in the conduit space immediately upstream from the burner. By this means the gas stream temperature leaving the conduit elbow or bend was at 1,360° C. for entry into the oxidation zone. Such temperature was sufficiently high to initiate a continuous reaction at an average estimated temperature in the range of 1,400–1,450° C. between the oxidizing gas and the $TiCl_4$–$AlCl_3$ vapor mixture being separately fed to said zone through a peripheral slot in the reactor and in a direction at right angles to the flow of the oxidizing gas being charged thereto. The hot gaseous suspension of $TiO_2$–$Al_2O_3$ composite formed in the reaction zone was withdrawn from the bottom of the reactor quickly quenched to below 450° C. and was charged to a conventional cyclone separator for removal of process gases. The raw pigment product recovered was calcined to remove adsorbed and occluded chlorides and was ground and finished in a micronizer type fluid energy mill to provide a high quality rutile $TiO_2$ pigment useful in various pigmenting applications.

While specific reactants, temperatures, ratios, hydrocarbon fuel and injecting means have been mentioned as employable in the above example, variance therefrom is contemplated in practicing the invention. Thus the atomizing jet used to inject the atomized fuel into the oxidizing gas can comprise any one of several known types. As noted, in the preferred method of atomizing the liquid fuel employs ultrasonic energy such as an ultrasonic generator of the gas type which, by adjustment of the energy input and frequency, provides control of the droplet size. Atomization by means of a gas fed to the spray nozzle also may be used, as may an inert gas, the gaseous products of the associated reaction or air. In the case of oxygen containing gas use, it can be employed above or below the ignition temperature, depending on the design and material of construction of the atomizing jet. When excessively high temperatures are involved in the preheating suitable cooling of the atomizer can be undertaken. For example, the atomizer can be constructed with a cooling jacket and a cooling medium circulated therethrough to keep the parts below failure temperature. Preferably, the atomizer is placed at a bend in the gas conduit and aimed toward the incoming oxygen-containing gas. This permits most of the jet to be located outside the hot gas stream and yet conveniently provides for the injection of the fuel droplets against and countercurrent to the direction of flow of the initially preheated gas. Furthermore, an eddy chamber can be provided in the liquid combustion or ignition zone as by suddenly enlarging the gas conveying conduit at or just upstream from the zone of combustion. The effective amount of enlargement for this purpose can range from 50 to 500% of the conduit cross-section to thus enable the average linear velocity of the gas to be suddenly and effectively reduced to from $\frac{1}{2}$ to $\frac{1}{10}$ its previous linear velocity or value just prior to effecting contact with the liquid fuel.

Likewise the ignition fuel used can comprise any saturated or unsaturated liquid hydrocarbon. Unsaturated liquid hydrocarbons, such as hexylene, octylene, benzene, and alkyl substituted derivatives of such hydrocarbons, such as toluene and xylene are preferred for use especially those having an atomic ratio of hydrogen to carbon no greater than 2. When saturated hydrocarbon liquids, such as octane or commercially available mixtures thereof such as gasoline, kerosene, fuel oils etc., are employed, the hydrogen-to-carbon ratio is preferably lowered in order to avoid chlorine loss. For example, this can be brought about by dispersing some finely divided carbon in the liquid.

Similarly, while about 1% AlCl$_3$ is present in the TiCl$_4$ reacted with the oxidizing gas in the foregoing example, use is contemplated of amounts of vaporized AlCl$_3$ equivalent to from .1% to 10% and preferably from .3% to 3% by weight, calculated as Al$_2$O$_3$, and based on the TiO$_2$ pigment under production. Also, from about 0.05% to 5% and preferably from .1% to 3% of water vapor can be present in the oxidizing gas medium, these percentage amounts being based on the total volume of gaseous reactants fed to the reaction zone.

Employment of the novel two-stage preheating of an oxidizing gas in accordance with this invention advantageously insures production on subsequent use of such gas in a TiCl$_4$ oxidation of a TiO$_2$ pigment adaptable for use in paints, enamels and finishes, as a delusterant for nylon, rayon and other synthetic fibers, and as a pigmenting ingredient in printing inks, paper, plastics, rubber, etc. Also it avoids undesired reactant and pigment contamination by reason of the long flame formation and delayed ignition previously encountered in preheating an oxidizing gas to the excessively high temperatures required for initiating and maintaining a TiCl$_4$ oxidation reaction. Furthermore, control over the location and containment of the flame with complete combustion of the fuel taking place within a short section of the gas-conveying conduit prevents undesired introduction of the flame into the oxidation reaction zone and the consequent pigment sintering which would ensue.

I claim:

1. In a process for preparing a titanium dioxide pigment through the vapor phase oxidation at an elevated temperature in a closed reaction zone of TiCl$_4$ with at least a stoichiometric amount of elemental oxygen present in an oxygen-containing gas, the improvement which comprises prior to introducing said gas into said reaction zone, subjecting the gas to a two-stage preheating treatment in which initially said gas is heated to at least the auto-ignition temperature for the second stage fuel under non-contaminating conditions to a temperature in the range of from 800–1300° C., and subsequently said gas is further heated to an increased temperature in the range of from 1,000–1,800° C. by injecting droplets of combustible liquid hydrocarbon fuel directly into said gas in an amount less than the stoichiometric equivalent of the elemental oxygen present in said gas and in a direction countercurrent to the direction of flow of said gas through a conveying conduit.

2. The process of claim 1 in which initially the oxidizing gas is heated to a temperature in the range of from 1,000–1,200° C., and thereafter is heated to a higher temperature in the range of from 1,200–1,600° C.

3. The process of claim 1 in which the liquid fuel employed is an unsaturated hydrocarbon.

4. The process of claim 1 in which the liquid employed fuel is toluene.

5. The process of claim 2 in which the liquid fuel employed is toluene.

6. The process of claim 1 in which formation and injection of the liquid fuel droplets employed is brought about ultrasonically.

7. The process of claim 1 in which the average linear velocity of the oxygen-containing gas through the conveying conduit is reduced suddenly and effectively by a factor of from ½ to ⅟₁₀ just prior to effecting contact with liquid fuel.

References Cited

UNITED STATES PATENTS

| | | | |
|---|---|---|---|
| 2,367,118 | 1/1945 | Heinen | 23—202 |
| 2,445,691 | 7/1948 | Pechukas | 23—202 |
| 2,541,495 | 2/1951 | Buchanan | 23—202 |
| 3,275,411 | 9/1966 | Freeman et al. | 23—202 |
| 3,297,411 | 1/1967 | Dear | 23—202 XR |
| 3,372,001 | 3/1968 | Wendell | 23—202 XR |

EDWARD STERN, Primary Examiner.

U.S. Cl. X.R.

106—300; 204—164